United States Patent [19]

Sherman

[11] Patent Number: 4,724,041

[45] Date of Patent: Feb. 9, 1988

[54] LIQUID DISPERSION COMPOSITION FOR, AND METHOD OF, POLISHING FERROUS COMPONENTS

[76] Inventor: Peter G. Sherman, Suite 400, 1130 E. Third St., Charlotte, N.C. 28204-2660

[21] Appl. No.: 934,468

[22] Filed: Nov. 24, 1986

[51] Int. Cl.$^4$ ............................ C23F 1/00; C23F 1/28; C09K 13/00

[52] U.S. Cl. .................... 156/637; 156/642; 156/645; 156/664; 156/903; 252/79.1; 252/79.4; 252/136; 252/100; 148/6.14 A; 148/6.15 R

[58] Field of Search .............. 252/79.1, 79.2, 79.4, 252/100, 136, 142; 156/637, 639, 642, 645, 664, 903; 148/6.14 A, 6.15 R

[56] References Cited

U.S. PATENT DOCUMENTS

| | | | |
|---|---|---|---|
| 2,666,000 | 1/1954 | DeHoff | 252/100 |
| 2,890,944 | 6/1959 | Hays | 156/664 X |
| 2,940,838 | 6/1960 | Snyder et al. | 156/664 X |
| 2,981,610 | 4/1961 | Snyder et al. | 156/664 X |
| 3,052,582 | 9/1962 | Snyder | 156/664 |
| 3,061,494 | 10/1962 | Snyder et al. | 156/664 |
| 3,094,489 | 6/1963 | Barnes | 252/79.2 |
| 4,086,176 | 4/1978 | Ericson et al. | 252/79.4 X |
| 4,491,500 | 1/1985 | Michaud et al. | 156/664 X |
| 4,532,066 | 7/1985 | Paszek et al. | 252/144 |

*Primary Examiner*—Bashore S. Leon
*Assistant Examiner*—Andrew J. Anderson
*Attorney, Agent, or Firm*—Daniel E. McConnell

[57] ABSTRACT

Compositions and methods of using the compositions in preparing ferrous metal components for subsequent surface electroplating by preparing a solution containing an acid and a sequestering agent, immersing the components and abrading media in the solution, and agitating the components and the abrading media while maintaining the components and the media immersed in the solution. The composition has, by defined weight percents, oxalic acid; a phosphorus sequestering agent; the ratio by weight of oxalic acid to sequestering agent being in a range of from about 0.7:1 to about 0.2:1; a quantity of an ammonifying agent sufficient and effective for adjusting the pH of the solution formed on dissolving the composition in water to a range of from about 3.5 to about 6; a quantity of a surfactant sufficient and effective for accomplishing wetting of the composition; and a quantity of a carrier material in the form of a suspending agent sufficient to make up the remainder of the composition.

15 Claims, No Drawings

LIQUID DISPERSION COMPOSITION FOR, AND METHOD OF, POLISHING FERROUS COMPONENTS

FIELD AND BACKGROUND OF INVENTION

This invention relates to compositions and methods of using the compositions in preparing ferrous metal components for subsequent surface electroplating by preparing a dispersion containing an acid and a sequestering agent, immersing the components and abrading media in the dispersion, and agitating the components and the abrading media while maintaining the components and the media immersed in the dispersion. Similar technology has been known heretofore from such disclosures as Hays U.S. Pat. No. 2,890,944; a series of United States Patents to Herman Ben Snyder including U.S. Pat. Nos. 2,940,838; 2,981,610; 3,052,582; and 3,061,494; and Michaud et al U.S. Pat. No. 4,491,500.

In accordance with the improvements of the present invention, the compositions used are liquid dispersions. In liquid form, the composition has, by weight percent excluding any water content; up to about 20% oxalic acid; up to about 50% of phosphorus sequestering and buffering agents; the ratio by weight of oxalic acid to phosphorus agents being in a range of from about 0.70:1 to 0.20:1 and preferably such as to provide a composition pH in a range of from about 3.5 to about 7; an amonifying agent; a surfactant; and a suspending agent sufficient and effective for enabling the suspension of the constituents in water so as to form the composition.

It has been known heretofore in the manufacture of ferrous metal components that electroplating of such components may serve the dual functions of protecting the ferrous material against rust or other deterioration and enhancing appearance. For such reasons, it is commonly done to plate hand tools such as wrenches and the like with bright electroplate finishes. In preparing components for such finishing. It is important that the surfaces to be plated have a certain degree of smoothness for appearance sake, and sometimes important that they be polished. While such polishing has been done in a number of different ways, chemical processes for metal removal have achieved some success and acceptance, and have followed generally the teachings of the prior patents listed above.

In processes of the type described, there is a constant balancing of harshness against productivity. In attempts to achieve high productivity of components and short cycle times for the use of equipment, some users have attempted the use of strongly acidic solutions. In attempts to achieve desirable surface finishes, other users have attempted the use of less acidic dispersions. In both instances, problems may be encountered with exhaustion of dispersions used and effluents created. Attempts at prolonging the usefulness of solutions have involved the use of sequestering agents to assist in avoiding exhaustion.

BRIEF DESCRIPTION OF INVENTION

Having in mind the efforts made in the past and the problems encountered, it is an object of this invention to achieve chemically polished surfaces in an optimal processing time and with minimal undesirable effluent. In realizing this object of the invention, a process of the general type briefly described hereinabove is improved by the use of an organic acid dispersion which achieves controlled metal removal at a desirable, predictable, rate. Production capabilities using the dispersion contemplated by this invention are better than those accomplished using the harsher solutions previously used, while the effluent from the process more nearly approaches a chemically neutral waste.

Yet another object of this invention is to provide compositions which may be formulated and handled as liquid dispersions, and further dispersed into water to provide the necessary working dispersion as needed. In realizing this object of the present invention, application of the dispersion to a flow-through type of process is facilitated and simplified handling is accomplished for certain users while reproducibility of result is achieved.

DETAILED DESCRIPTION OF INVENTION

Some of the objects of the invention having been stated, other objects will appear as the description proceeds. While the present invention will be described more fully hereinafter, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Stated generally, the compositions contemplated by the present invention are liquid dispersions adapted to be mixed with water and used in a wet process abrasive finishing apparatus for ferrous metals, such as a tumbling barrel or the like. The liquid dispersion comprises, by weight percent, up to about 90% water. Excluding the water content, the dispersion comprises up to about 20% oxalic acid; up to about 50% of phosphorus sequestering and buffering agents; the ratio by weight of oxalic acid to phosphorus agents being in a range of from about 0.70:1 to 0.20:1 and preferably such as to provide a composition pH in a range of from about 3.5 to about 7; an amonifying agent; a surfactant; and a suspending agent sufficient and effective for enabling the suspension of the constituents in the water present so as to form the composition.

The phosphorus sequestering agent may be any of the inorganic phosphates which display the characteristic of sequestering ferrous metal ions, and/or many of the organic phosphates which display such characteristics Those which have been found to perform well in the compositions of this invention are pyrophosphates, tripolyphosphates, and phosphonates. That which is most preferred for certain compositions is tetrasodium pyrophosphate. The phosphates used may, in fact be produced by chemical reactions occurring as the composition is prepared, as mentioned hereinafter.

The buffering and/or ammonifying agent(s) may be any ammonia releasing or generating material which will have the effect of moderating the pH of the dispersion. It has been determined that the combined effect of the acid constituent in removing metal and the sequestering agent in holding metal ions in dispersion and preventing their re-deposition onto the components in a plating type process is pH dependent, and will not start and/or proceed properly at pH levels below about 3.5. Thus it is important, in the compositions and methods contemplated by this invention, to control that factor. In the liquid dispersion using such materials, such control may be accomplished by a balancing of monoammonium phosphate and diammonium phosphate. In certain preferred forms of the invention, the weight percentages of these constituents is equal. In other operable forms, the balance may shift more toward one or the other of the two, with increasing quantities of diammonium phosphate favoring higher pH and increasing quantities of monoammonium phosphate favoring lower pH for the dispersion and the operating dispersions. Alternatively, the ammonifying agent may be derived from such materials as liquid ammonium hydroxide or gaseous ammonia, with reactions occurring on preparation of the compositions of this invention leading to the appearance in the composition of the phosphate forms. In the latter instance, pH control will often be facilitated.

In order to assure that the compositions of this invention more easily enter dispersion with water which mixed for use, it is desirable to incorporate a wetting agent in the form of a surfactant. A preferred surfactant is a non-foaming, nonionic material, and it is further preferred that such material be of a low HLB type.

The ratio of oxalic acid to sequestering agent is significant in balancing speed of metal removal to accomplish surface finishing against etching from excessively aggressive metal removal inasmuch as both the materials used contribute to metal removal. Experimentation with variations in the ratio of acid to sequestering agent have shown that, as a general matter, increasing the quantity of sequestering agent in relation to acid increases the speed of metal removal and also increases the likelihood that metal removal causes a distinctive "frosty" appearance which is deemed etching and which experience has shown must be polished before satisfactory plating can be accomplished. While the mechanism leading to such results is perhaps not fully understood, it is believed likely that the varying concentrations cause varying rates of effectiveness of metal removal in the microscopic level "peaks and valleys" or roughnesses of the components. Where metal removal is essentially the same in both areas, a frosty finish results. Where metal removal occurs more heavily at the peaks, a greater smoothness is achieved and the finished component is more acceptable. Depending in part upon the specific ferrous alloy being worked, ratios of acid to agent in the range of from about 0.70 part to 1 part to about 0.20 part to 1 part have been found acceptable and are contemplated by this invention. A preferred range is about 0.25 part to 1 part.

In the liquid dispersion composition, the chemicals present as the acid and possibly those chosen as sequestering agent(s) are not readily soluable in water. Thus the dispersion which enables handling as a liquid is maintained by the use of a suspending agent. The suspending agent must be a material which acts as a gelling and suspending agent in salt dispersions, and two useful materials are xanthan gum and the proprietary line of materials sold by B.F. Goodrich Chemicals under the name Carbopol.

In use, the compositions of this invention may be used in any known type of wet abrasive finishing equipment capable of withstanding the corrosive effects of the dispersions which result. Examples of such equipment are listed in the prior patents listed above, and may include open and closed tumbling barrels, spinning machines, vibrating machines, and spindle machines. Such equipment may be capable of batch processing, continuous or flow through processing, or both. Solutions used may be batched or recirculated. The choice of such equipment is left to the skill of the person skilled in the applicable arts and learning of this invention. However, as brought out more fully hereinafter, a preferred process uses apparatus arranged for flow through operation.

As briefly mentioned above, a method of preparing ferrous metal components for subsequent surface electroplating in accordance with this invention includes the known steps of preparing a dispersion containing an acid and a sequestering agent, immersing the components and abrading media in the dispersion, and agitating the components and the abrading media while maintaining the components and the media immersed in the dispersion.

As practiced, a desired quantity of components are loaded into the treatment vessel and washed by flowing water through the vessel. The rinsing flow is stopped, and a flow of the dispersion is begun, preferably using a peristaltic pump to achieve a metered flow. After some interval of time (on the order of about 10 to 60 minutes), sufficient treatment composition has been added to the water retained in the load to begin the "cutting" action, and at that time water flow is introduced. Preferably, the water flow mixes with the treatment composition before the dispersion thus formed enters the treatment vessel. The starting of water flow may be determined by time (as suggested above) or by monitoring the pH of the spent dispersion leaving the flow-through treatment vessel. The flow of treatment composition and water is then continued for the interval of time necessary to accomplish the desired finishing action for the components, typically on the order of 70 to 150 minutes. During this interval of time, the pH of spent dispersion leaving the treatment vessel should be in the range of from about 6.0 to about 7.0.

After the components have reached a desired finish, the flow of water is greatly increased (on the order of ten times) while the flow of the treatment composition is decreased (on the order of 70%). With such relative flow rates, the dispersion which has been functioning as a finishing composition functions as a cleaning composition and cleans from the components any remaining residue of the ferric/ferrous sodium/ammonium oxalates which have been formed during the finishing stage.

It is to be noted that an apparent factor in the successful operation of compositions as contemplated by this invention arises out of the differing solubilities of sodium and ammonium oxalates and the ferric/ferrous sodium/ammonium oxalates formed when the compositions are added to the treatment vessels in which ferrous components are being finished. The latter materials are significantly more highly soluble in water, contributing to the finishing action sought and accomplished by this invention.

Certain experiments conducted in the development of this invention are reflected in the following examples.

EXAMPLE 1

Using a three cubic foot volume vibratory finishing vessel and open end wrenches as ferrous components to be finished, the components were rinsed as described above and a dispersion was then introduced which had the following formula:

| Constituent | Weight percent |
| --- | --- |
| Water | 43.73 |
| Oxalic acid | 15.86 |

| Constituent | Weight percent |
| --- | --- |
| Diammonium Phosphate | 13.59 |
| Tetrasodium pyrophosphate | 13.59 |
| suspending agent | 12.80 |
| surfactant | 0.45 |

The treatment composition was fed into the apparatus using a peristaltic pump and at a flow rate on the order of 0.5 ounce per minute. About three minutes after the dispersion flow was begun, water flow through the vessel was begun at about 1.0 gallon per hour, with the water flow and dispersion flow being delivered through a common pipe for pre-mixing before reaching the vessel. Finishing of the components continued for about one hour, during which time water and dispersion flows were manipulated to attain and maintain an effluent pH in the range of from about 5.8 to about 6.3. The components attained a bright and shiny finish. The flow of dispersion was then stopped and water flow increased to about 10 gallons per hour until the drain water ran essentially clean.

EXAMPLE 2

A load of sockets for socket wrenches were run with a pyramid form media in a ten cubic foot volume vibratory finishing vessel. The dispersion introduced had the formula:

| Constituent | Weight percent |
| --- | --- |
| Water | 48.8 |
| Oxalic acid | 20.0 |
| Diammonium Phosphate | 13.7 |
| Tetrasodium pyrophosphate | 13.7 |
| suspending agent | 2.3 |
| surfactant | 1.5 |

The treatment composition was fed into the apparatus using a peristaltic pump and at a flow rate of about 0.66 ounce per minute. About ten minutes after the dispersion flow was begun, water flow through the vessel was begun at about 1.2 gallon per hour, with the water flow and dispersion flow being delivered through a common pipe for pre-mixing before reaching the vessel. Finishing of the components continued for about one hour and twenty minutes, during which time water and dispersion flows were manipulated to attain and maintain an effluent pH in the range of from about 5.8 to about 6.3. The components attained a bright and shiny finish. The flow of dispersion was then stopped and water flow increased to about 2 gallons per hour until the drain water ran essentially clean.

EXAMPLE 3

A process similar to that of Example 2 was run using a dispersion having the formulation:

| Constituent | Weight percent |
| --- | --- |
| Water | 42 |
| suspending agent | 15 |
| Diammonium Phosphate | 12 |
| Monoammonium Phosphate | 12 |
| Oxalic acid | 10 |
| Tetrasodium pyrophosphate | 8.5 |
| surfactant | 0.5 |

The increase in suspending agent made this dispersion much thicker. However, operation and results were essentially similar to Example 2 above.

EXAMPLE 4

A dispersion was prepared using liquid phosphoric acid as a phosphorous source and ammonium hydroxide and sodium hydroxide as sodium sources. The dispersion was prepared to a formulation of:

| Constituent | Weight percent |
| --- | --- |
| Phosphoric acid | 44 |
| Ammonium hydroxide | 24 |
| Oxalic acid | 12 |
| Water | 9.5 |
| Sodium hydroxide | 6 |
| suspending agent | 3.5 |
| surfactant | 1 |

The dispersion was supplied through a peristaltic pump in a manner similar to that of the examples above. However, the feed rates of dispersion and water were adjusted in relation to one another and to the number of square inches of ferrous metal surface to be polished. With the polishing action established as described above in Example 1, the feed rates of dispersion/water were adjusted to be 0.66 lb/hour of dispersion and 2.25 lb/hour of water for each one thousand square inches of surface being treated. Results achieved were substantially those of the prior examples. Further, the results were reproducible from run to run.

The experiment of Example 4 was extended to explore the range of ratios of dispersion to water in which reproducible results were achieved. It was discovered that a ratio of dispersion to water delivered may range over ratios of from about 0.3:1 to about 0.9:1 while reproducible results are obtained. The range appears to reflect the particular dispersion formula followed, with a consistently followed dispersion formula achieving reproducible results where the feed rates used were also adjusted so that a consistent total flow rate as measured against the metal area being polished was maintained at about 3 lb/hour per one thousand square inches of metal area being treated.

While the examples here included will reflect the parameters varied in experimentation done during development of the present invention, the forms of the present invention preferred at the writing of this description are a liquid dispersion which has as its constituents those listed in Example 4 hereinabove.

In the specification there have been set forth preferred embodiments of the invention and, although specific terms are used, the description thus given uses terminology in a generic and descriptive sense only and not for purposes of limitation.

What is claimed is:

1. A liquid dispersion composition adapted to be mixed with water and used in a wet process abrasive finishing apparatus for ferrous metals, such as a tumbling barrel or the like, and comprising, by weight percent excluding any water content; up to about 20% oxalic acid; up to about 50% of a phosphorus sequestering agent; the ratio by weight of oxalic acid to sequestering agent being in a range of from about 0.70:1 to about 0.20:1; a quantity of an ammonifying agent sufficient and effective for adjusting the pH of the composition to a range of from about 3.5 to about 7; a quantity of a surfactant sufficient and effective for accomplishing wetting of the composition; and a quantity of a carrier material sufficient to make up the remainder of the composition and effective to maintain the constituents of the composition in a readily handled liquid form.

2. A composition according to claim 1 which is a liquid dispersion formed in water and further wherein said carrier material is a suspending agent effective for suspending the constituents of the composition as a dispersion in water.

3. A composition according to claim 2 wherein the water content of the dispersion, by weight percent and taking into consideration all constituents of the dispersion, is in the range of up to about 90 percent.

4. A composition according to claim 1 wherein said phosphorus sequestering agent is derived from phosphoric acid.

5. A composition according to claim 1 wherein said ammonifying agent is ammonium hydroxide.

6. A liquid dispersion composition adapted to be mixed with water and used in a wet process abrasive finishing apparatus for ferrous metals, such as a tumbling barrel or the like, and consisting essentially of, by weight percent; from about 30% to about 50% water; up to about 2% of a surfactant; from about 50% to about 33% of a mixture of oxalic acid and phosphorus sequestering agents selected from among the group consisting of pyrophosphates, tripolyphosphates, and phosphonates, with the ratio by weight of oxalic acid to sequestering agents being in a range of from about 0.70:1 to about 0.20:1; up to about 28% of an ammonifying agent, the amount being sufficient and effective for adjusting the pH of the composition to a range of from about 3.5 to about 7 and a quantity of a suspending agent sufficient to make up the remainder of the composition and to cause the remainder of the constituents to remain suspended in the water.

7. A liquid dispersion composition adapted to be mixed with water and used in a wet process abrasive finishing apparatus for ferrous metals, such as a tumbling barrel or the like, and comprising, by weight percent; up to about 90% water; up to about 20% oxalic acid; up to about 50% phosphorus sequestering and buffering agents; the ratio by weight of oxalic acid to phosphorus agents being in a range of from about 0.70:1 to 0.20:1 and being sufficient and effective to provide a composition pH in a range of from about 3.5 to about 7; up to about 28% of an ammonifying agent; a quantity of a surfactant sufficient and effective for accomplishing wetting of the composition; and a quantity of a suspending agent sufficient to make up the remainder of the composition.

8. A composition according to one of claim 6 or claim 7 wherein said phosphorus sequestering agent is a pyrophosphate.

9. A composition according to claim 8, wherein said phosphorus sequestering agent is tetrasodium pyrophosphate.

10. A composition according to one of claim 6 or claim 7 wherein said ammonifying agent is an ammonium phosphate.

11. A composition according to one of claim 6 or claim 7 wherein said suspending agent is xanthan gum.

12. In a method of preparing ferrous metal components for subsequent surface electroplating which includes the steps of preparing a final dispersion containing an acid and a sequestering agent, immersing the components and abrading media in the final dispersion, and agitating the components and the abrading media while maintaining the components and the media immersed in the final dispersion, the improvement comprising the steps of: preparing the final dispersion by mixing with water a flowable first liquid dispersion composition consisting essentially, by weight percent excluding any water content, of up to about 20% oxalic acid; up to about 50% of a phosphorus sequestering agent; the ratio by weight of oxalic acid to sequestering agent being in a range of from about 0.70:1 to about 0.20:1; a quantity of an ammonifying agent sufficient and effective for adjusting the pH of the composition to a range of from about 3.5 to about 7; a quantity of a surfactant sufficient and effective for accomplishing wetting of the composition; and a quantity of a carrier material sufficient to make up the remainder of the composition and effective to maintain the constitutents of the composition in a readily handled liquid form; monitoring the pH level of the final dispersion during agitation of the components and abrading media; and responding to monitored pH levels by adjusting the pH level of the final dispersion to maintain such pH within a range of from about 3.5 to about 7.0 throughout agitation of the components and abrading media.

13. In a method of preparing ferrous metal components for subsequent surface electroplating which includes the steps of preparing a final dispersion containing an acid and a sequestering agent, immersing the components and abrading media in the final dispersion, and agitating the components and the abrading media while maintaining the components and the media immersed in the final dispersion, the improvement comprising the steps of: preparing the final dispersion by mixing with water a flowable first dispersion consisting essentially, by weight present, of from about 30% to about 50% water; up to about 20% oxalic acid; up to about 50% of a phosphorus sequestering agent; the ratio by weight of oxalic acid to sequestering agent being in a range of from about 0.70:1 to about 0.20:1; a quantity of an ammonifying agent sufficient and effective for adjusting to no less than about 3.5 the pH of the final dispersion formed on dissolving the first dispersion in water; a quantity of a surfactant sufficient and effective for accomplishing wetting of the first dispersion; and a quantity of a suspending agent sufficient to make up the remainder of the first dispersion; monitoring the pH level of the final dispersion during agitation of the components and abrading media; and responding, to monitored pH levels by adjusting the pH level of the final dispersion to maintain such pH within a range of from about 3.5 to about 7.0 throughout agitation of the components and abrading media.

14. In a method of preparing ferrous metal components for subsequent surface electroplating which includes the steps of preparing a solution containing an acid and a sequestering agent, immersing the components and abrading media in the solution, and agitating the components and the abrading media while maintaining the components and the media immersed in the solution, the improvement comprising the steps of: preparing the solution by mixing with water, a flowable dispersion consisting essentially by weight percent, of from about 30% to about 50% water; up to about 2% of a surfactant; from about 50% to about 33% of a mixture of oxalic acid and phosphorus sequestering agents selected from among the group consisting of pyrophosphates, tripolyphosphates, and phosphonates, with the ratio by weight of oxalic acid to sequestering agents being in a range of from about 0.70:1 to about 0.20:1; up to about 28% of an ammonifying agent the amount being sufficient and effective for adjusting the pH of the solution formed on mixing the dispersion with water to a range of from about 3.5 to about 7; and a quantity of a suspending agent sufficient to make up the remainder of the dispersion and to cause the remainder of the constituents to remain suspended in the water; monitoring the pH level of the solution during agitation of the components and abrading media; and responding to monitored pH levels by adjusting the pH level of the solution to maintain such pH within a range of from about 3.5 to about 7.0 throughout agitation of the components and abrading media.

15. In a method of polishing ferrous metal components which includes the steps of preparing a solution containing an acid and sequestering agents, immersing the components and abrading media in the solution, and agitating the components and the abrading media while maintaining the components and the media immersed in the solution, the improvement comprising the step of flowing through the components and abrading media at a rate of about 3 pounds per hour per thousand square inches of ferrous metal surface to be treated a solution of a dispersion of acid and sequestering agents in water, the ratio of dispersion to water being in the range of from about 0.30:1 to about 0.90:1 and the dispersion consisting essentially, by weight percent excluding any water content, of up to about 20% oxalic acid; up to about 50% of phosphorus sequestering agents; the ratio by weight of oxalic acid to sequestering agents being in a range of from about 0.70:1 to about 0.20:1; a quantity of an ammonifying agent sufficient and effective for adjusting the pH of the dispersion to a range of from about 3.5 to about 7; a quantity of a surfactant sufficient and effective for accomplishing wetting of the dispersion; and a quantity of a carrier material sufficient to make up the remainder of the dispersion and effective to maintain the constituents of the dispersion in a readily handled liquid form.

* * * * *